(12) United States Patent
Bernardo

(10) Patent No.: US 9,701,179 B2
(45) Date of Patent: Jul. 11, 2017

(54) COLLAPSIBLE SUN COVER FOR MOTOR VEHICLE INTERIOR

(71) Applicant: Alfredo P. Bernardo, Pasig (PH)

(72) Inventor: Alfredo P. Bernardo, Pasig (PH)

( * ) Notice: Subject to any disclaimer, the term of this patent is extended or adjusted under 35 U.S.C. 154(b) by 0 days.

(21) Appl. No.: 13/914,518

(22) Filed: Jun. 10, 2013

(65) Prior Publication Data
US 2013/0340956 A1    Dec. 26, 2013

Related U.S. Application Data

(63) Continuation of application No. 12/268,979, filed on Nov. 11, 2008, now abandoned.

(60) Provisional application No. 60/987,108, filed on Nov. 12, 2007.

(30) Foreign Application Priority Data

Nov. 12, 2008 (AU) ................. 2008243218

(51) Int. Cl.
*B60J 11/00* (2006.01)
*B60J 1/20* (2006.01)

(52) U.S. Cl.
CPC ......... *B60J 1/2011* (2013.01); *B60J 1/2091* (2013.01)

(58) Field of Classification Search
CPC ....... B60N 2/6009; B60J 11/00; B60J 1/2011; B60J 1/2091; E04H 15/06; E04H 15/42
USPC ............. 160/351, 352, 370.21; 296/63, 70, 296/100.11, 136.03; 297/184.11
See application file for complete search history.

(56) References Cited

U.S. PATENT DOCUMENTS

| | | | | |
|---|---|---|---|---|
| 194,923 | A * | 9/1877 | McIntyre | 135/88.02 |
| 390,790 | A | 10/1888 | Luce | |
| 2,594,910 | A * | 4/1952 | Germann | 296/98 |
| 3,454,021 | A * | 7/1969 | Morris | E04H 15/42 135/118 |
| 3,457,930 | A * | 7/1969 | Roy | E04H 15/42 135/119 |
| 4,262,955 | A | 4/1981 | Duda | |
| 4,377,307 | A * | 3/1983 | Santarelli | 296/136.03 |
| 4,792,178 | A * | 12/1988 | Kokx | 296/98 |
| 4,828,319 | A * | 5/1989 | Benson | 296/136.03 |
| 4,986,343 | A * | 1/1991 | Sing | 165/41 |
| 4,997,226 | A | 3/1991 | Grimes | |
| 5,114,204 | A | 5/1992 | Bernardo | |
| 5,201,565 | A * | 4/1993 | Berardino | 296/136.03 |
| 5,267,774 | A | 12/1993 | Garner et al. | |
| D355,405 | S * | 2/1995 | Sligh | D12/403 |
| 5,562,115 | A * | 10/1996 | Sotelo | A45F 4/04 135/100 |
| 5,806,913 | A | 9/1998 | Telehowski et al. | |
| 6,161,893 | A * | 12/2000 | Ewing et al. | 296/152 |
| 6,192,967 | B1 | 2/2001 | Huang | |
| 6,505,638 | B1 * | 1/2003 | Powell | E04H 15/18 135/115 |

(Continued)

FOREIGN PATENT DOCUMENTS

DE        3103696 A1    8/1982

*Primary Examiner* — Katherine Mitchell
*Assistant Examiner* — Abe Massad
(74) *Attorney, Agent, or Firm* — West & Associates, A PC; Stuart J. West

(57) ABSTRACT

A motor vehicle accessory capable of shielding the interior of a car from the sun, specifically a device that can cover the entire interior surface of a vehicle.

3 Claims, 15 Drawing Sheets

(56) References Cited

U.S. PATENT DOCUMENTS

| | | | | |
|---|---|---|---|---|
| 6,988,505 B2* | 1/2006 | Powell | ............ | E04H 15/44 135/124 |
| 7,021,694 B1* | 4/2006 | Roberts | ............ | B60J 7/102 135/88.13 |
| 7,290,553 B2* | 11/2007 | Prevost | ............ | E04H 15/48 135/143 |
| 7,296,584 B2* | 11/2007 | Goldwitz | ............ | E04H 15/44 135/121 |
| 2009/0167051 A1* | 7/2009 | Bernardo | ............ | 296/136.03 |
| 2015/0068573 A1* | 3/2015 | Jin | ............ | E04H 15/42 135/147 |

* cited by examiner

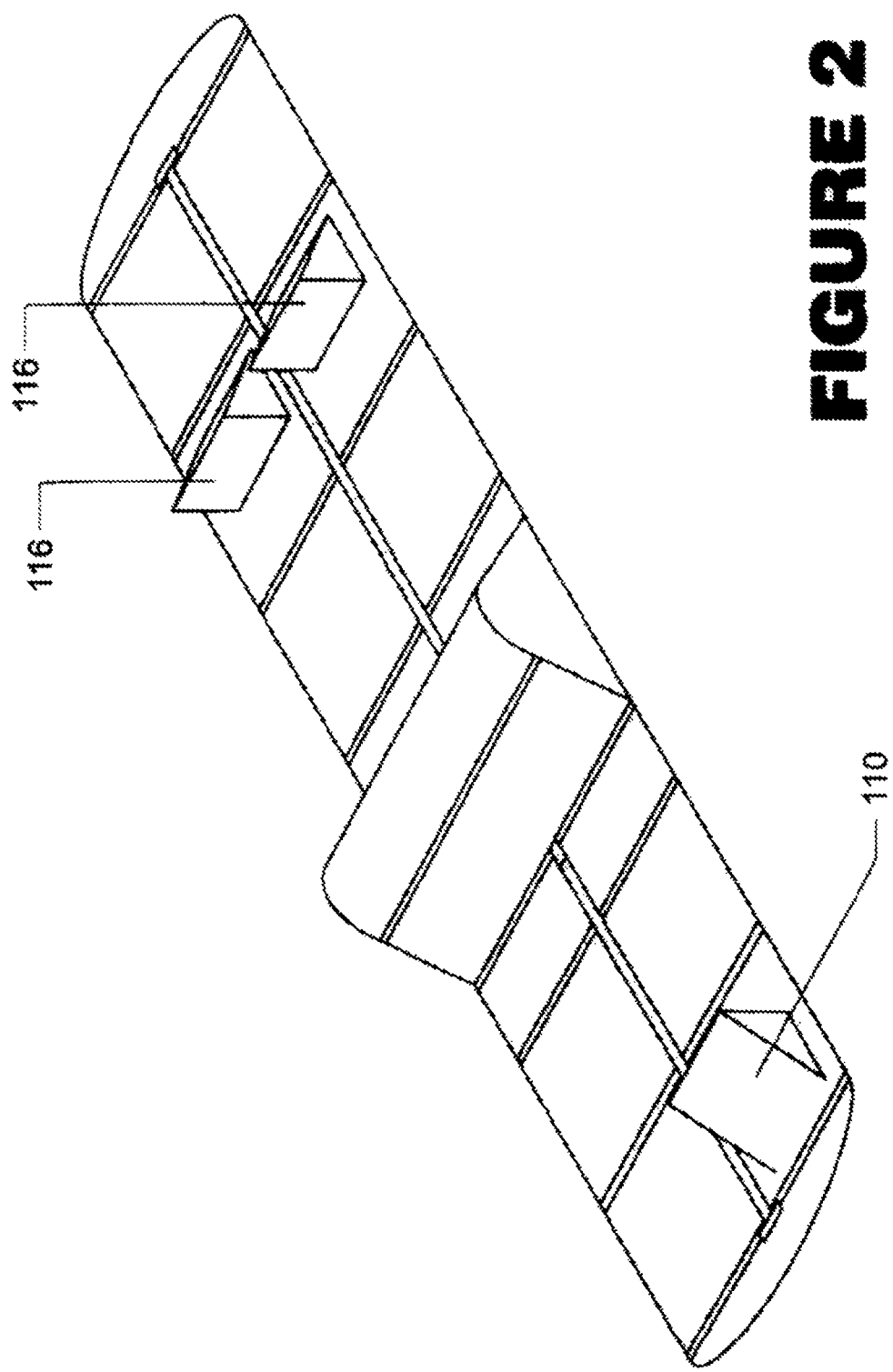

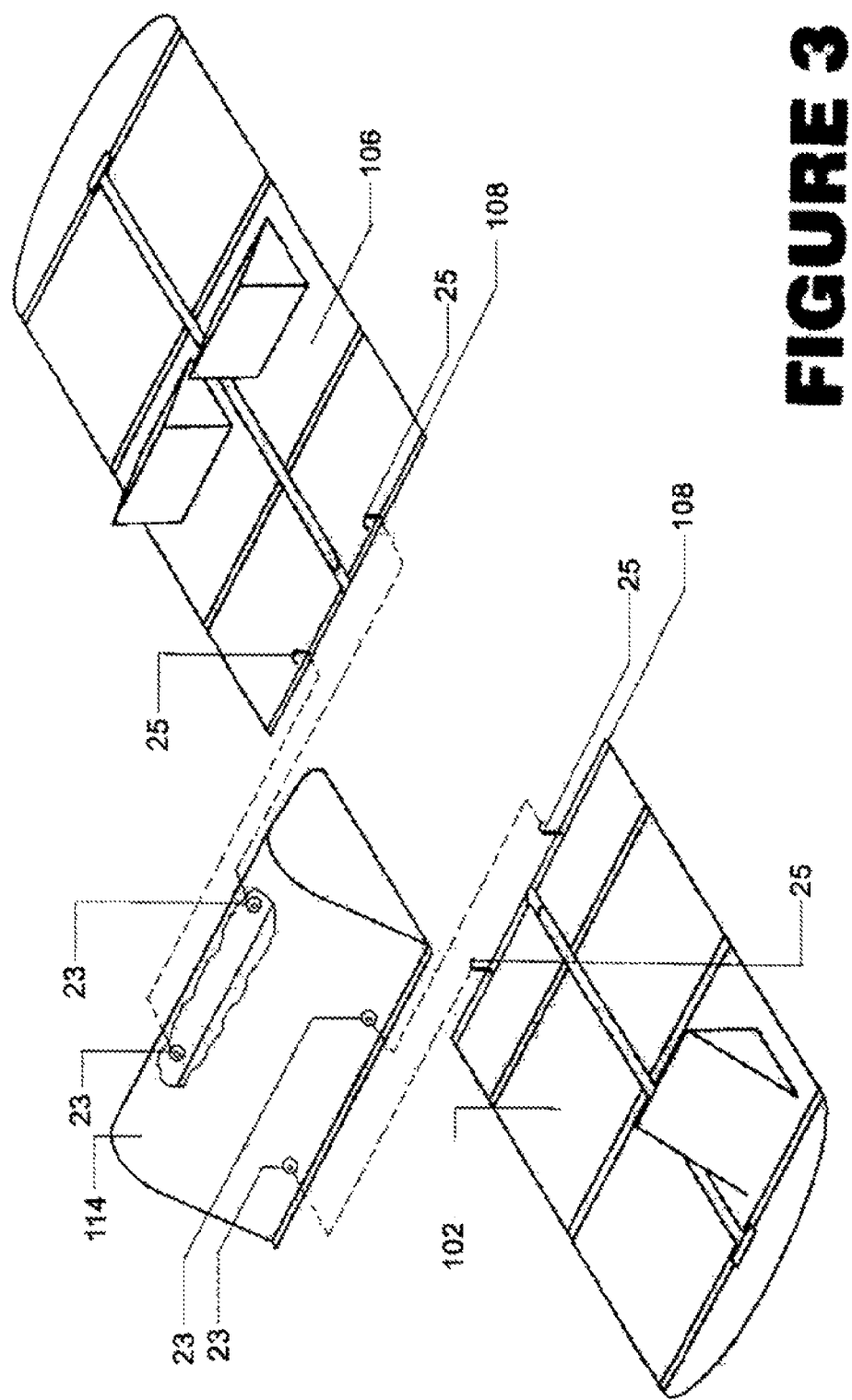

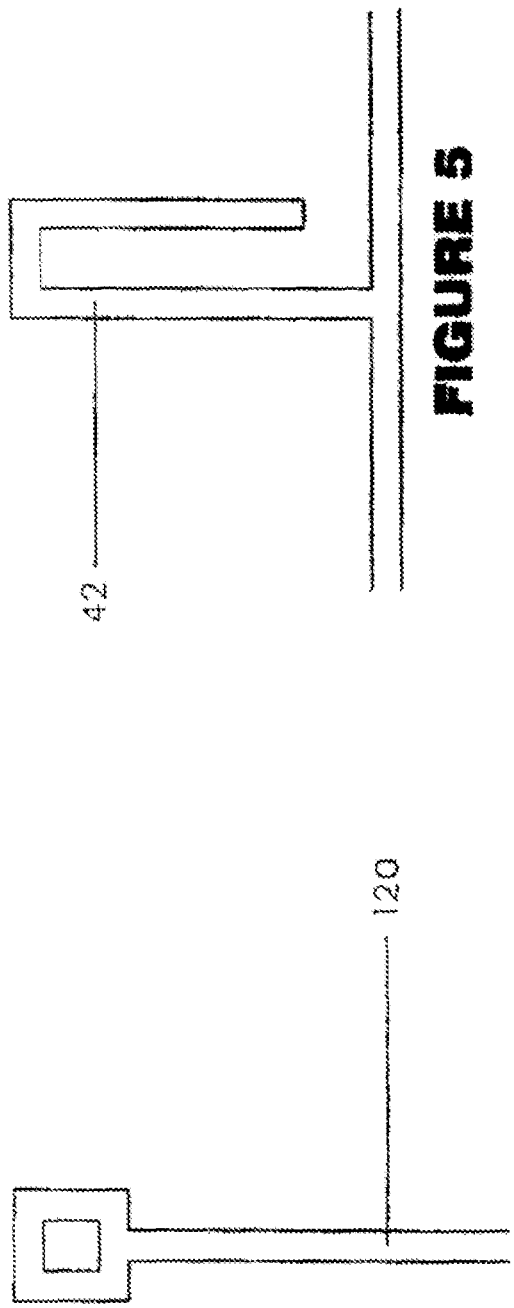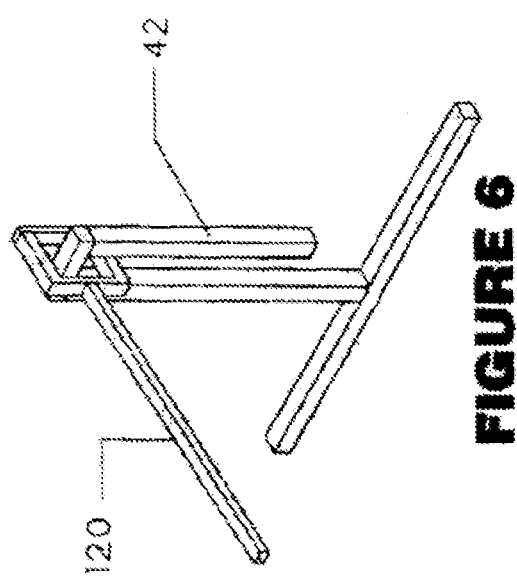

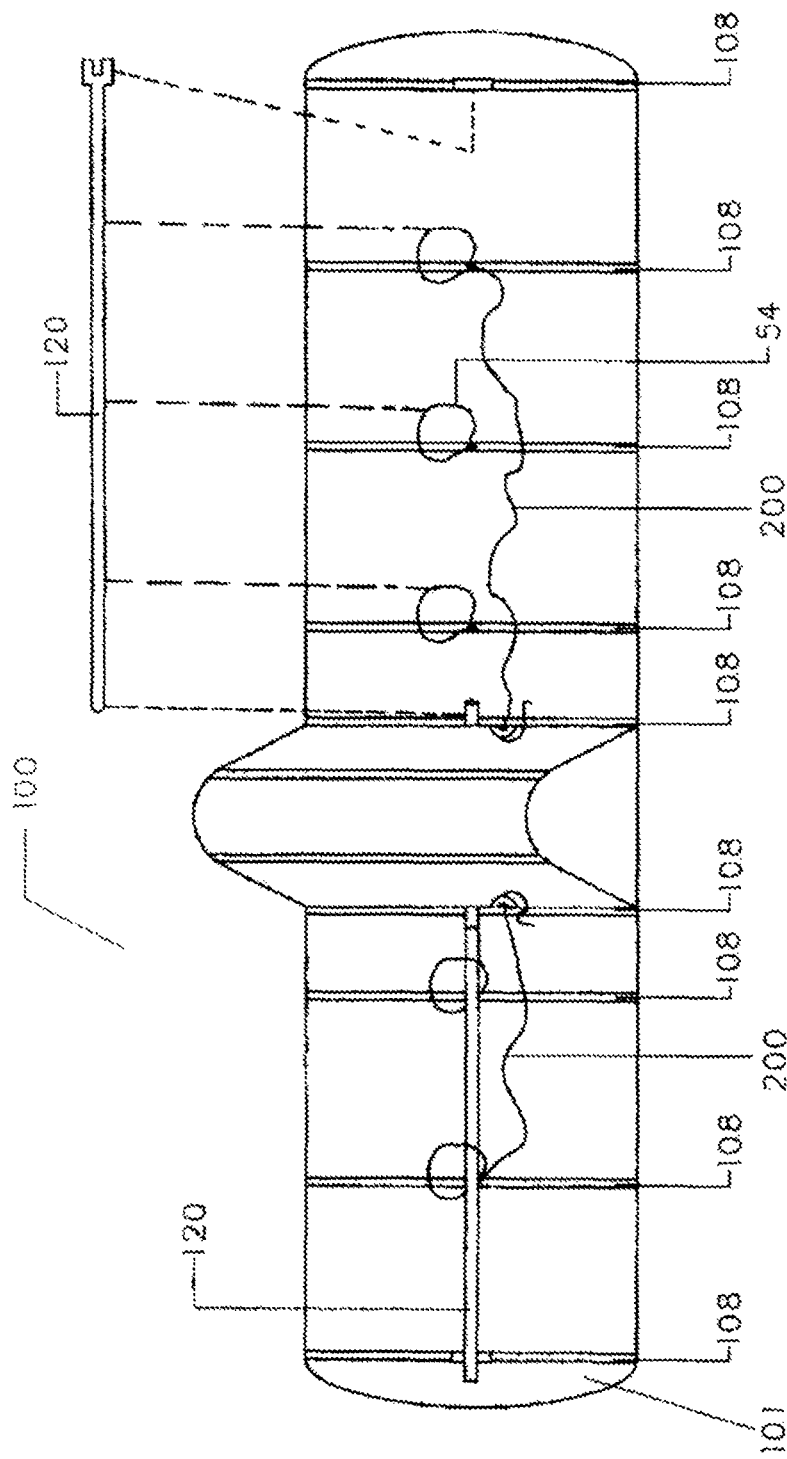

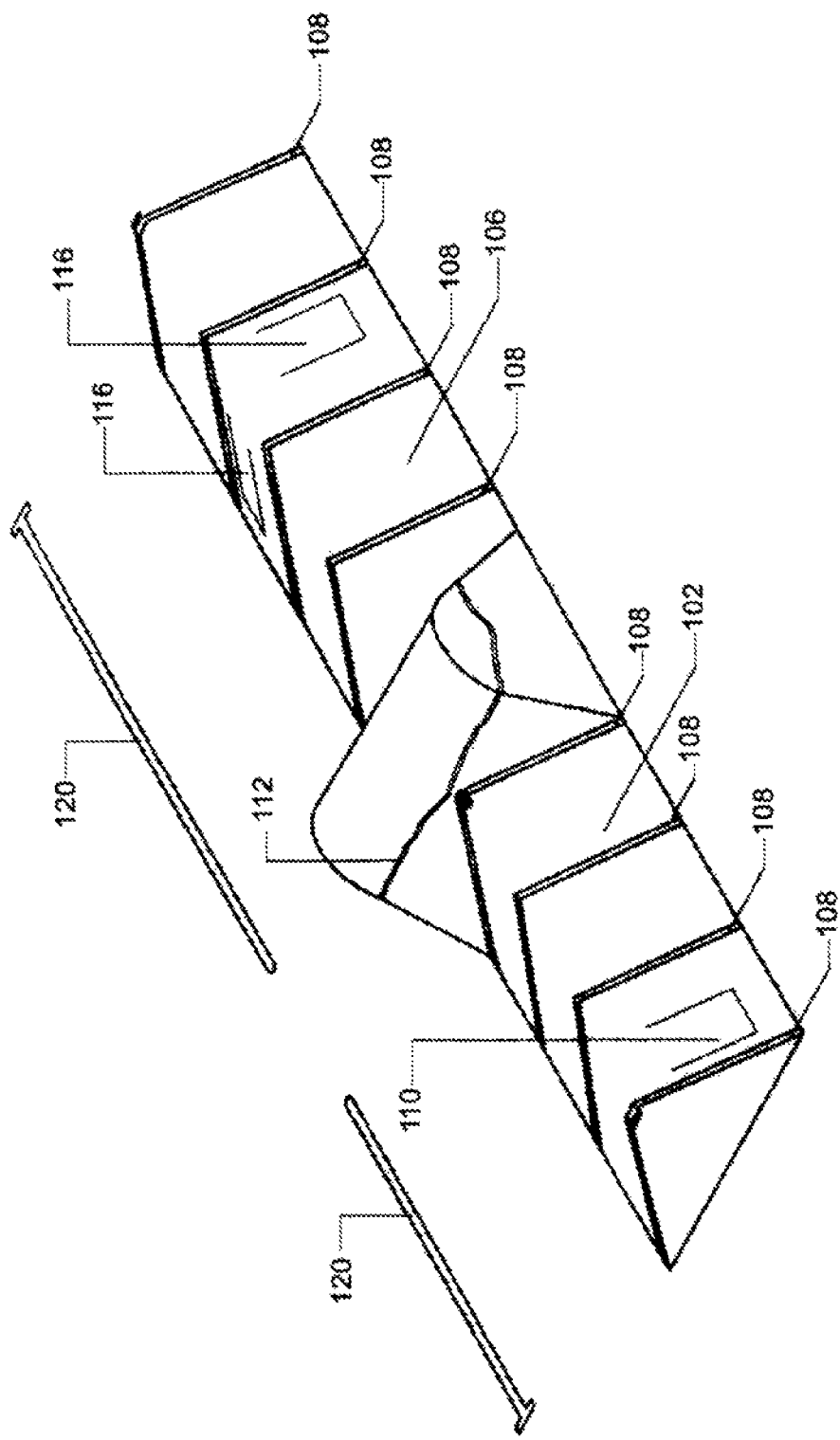

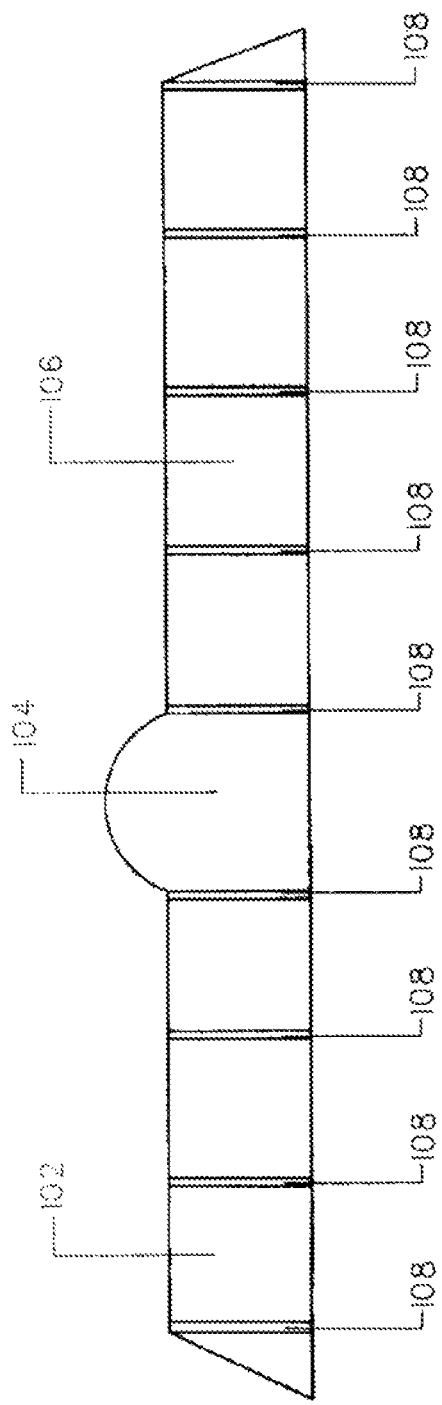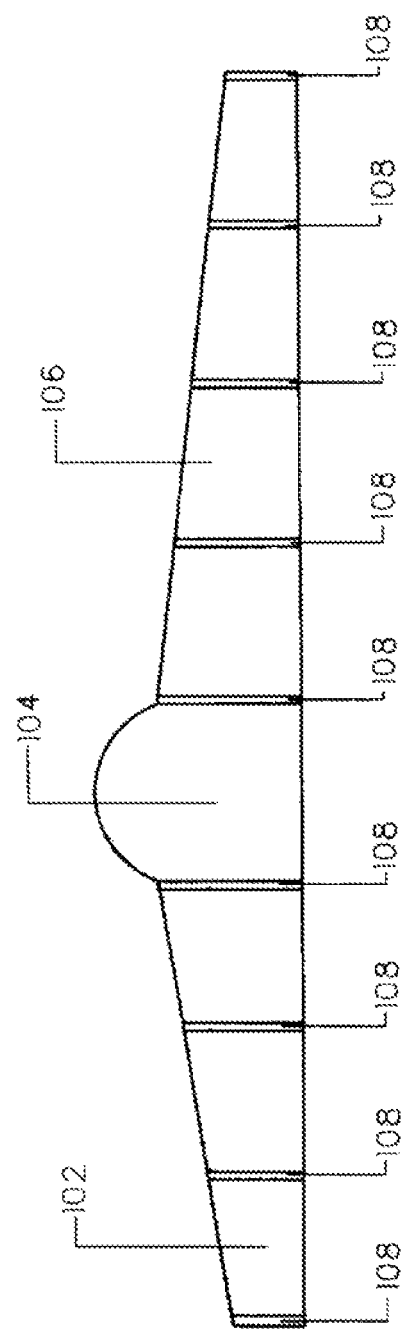

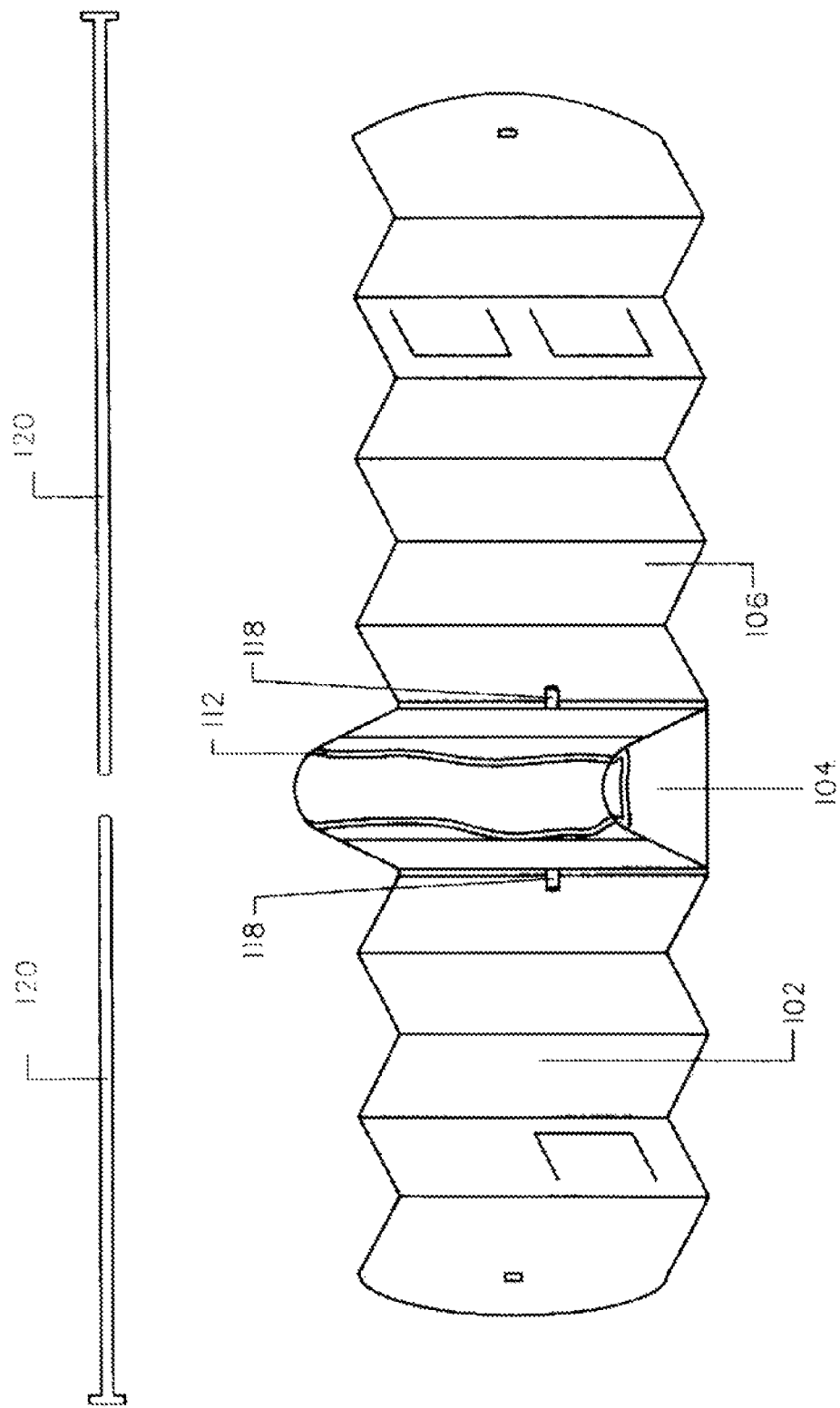

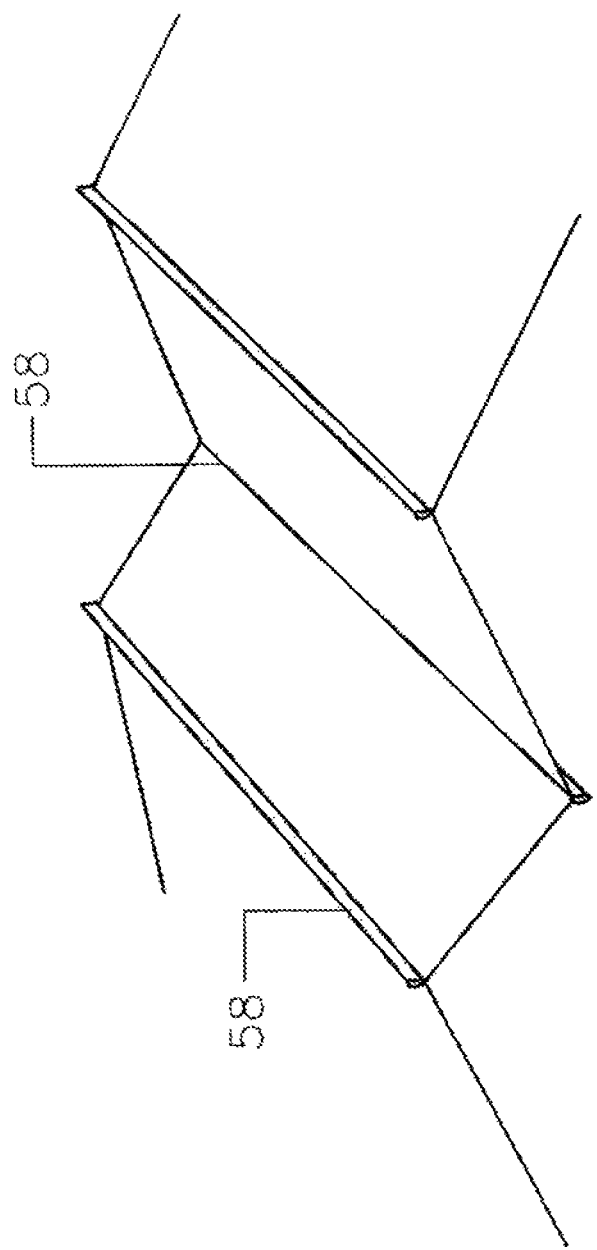

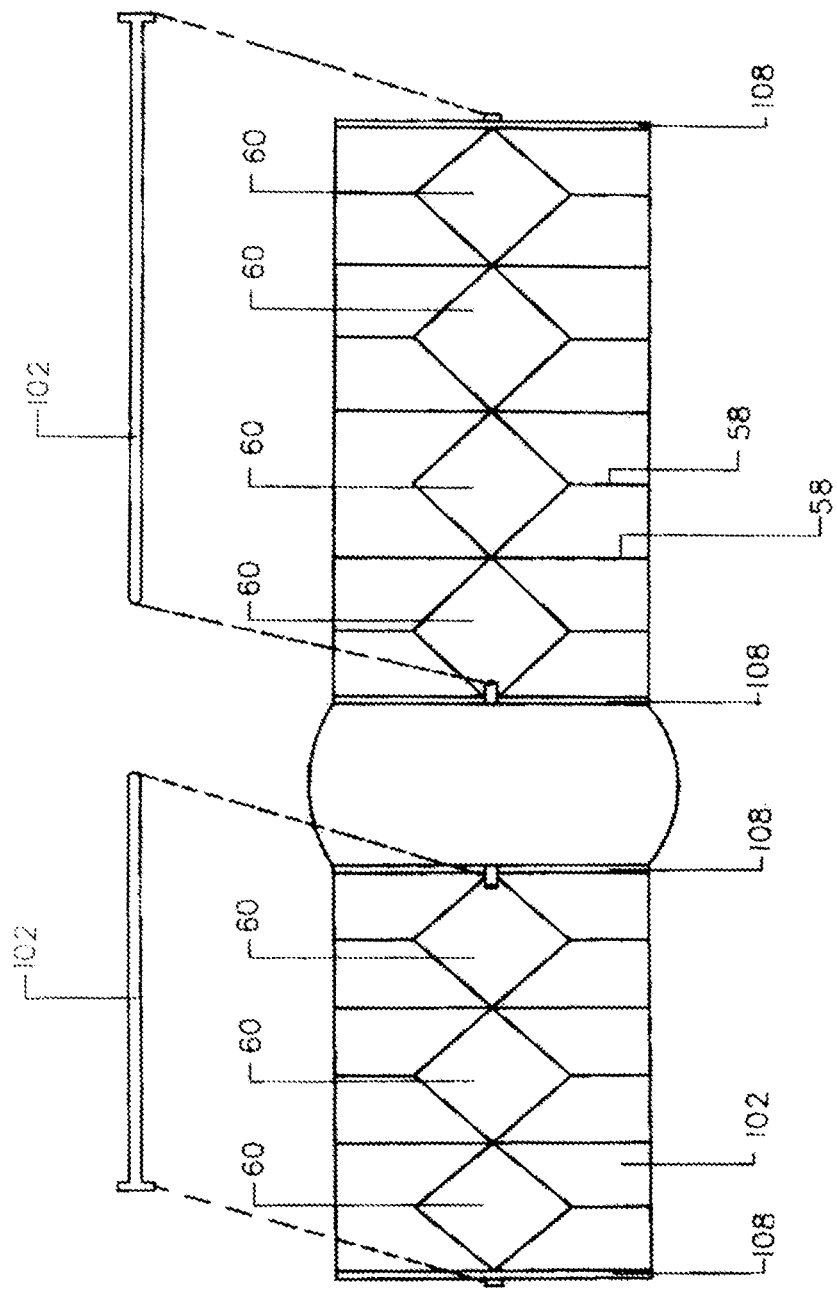

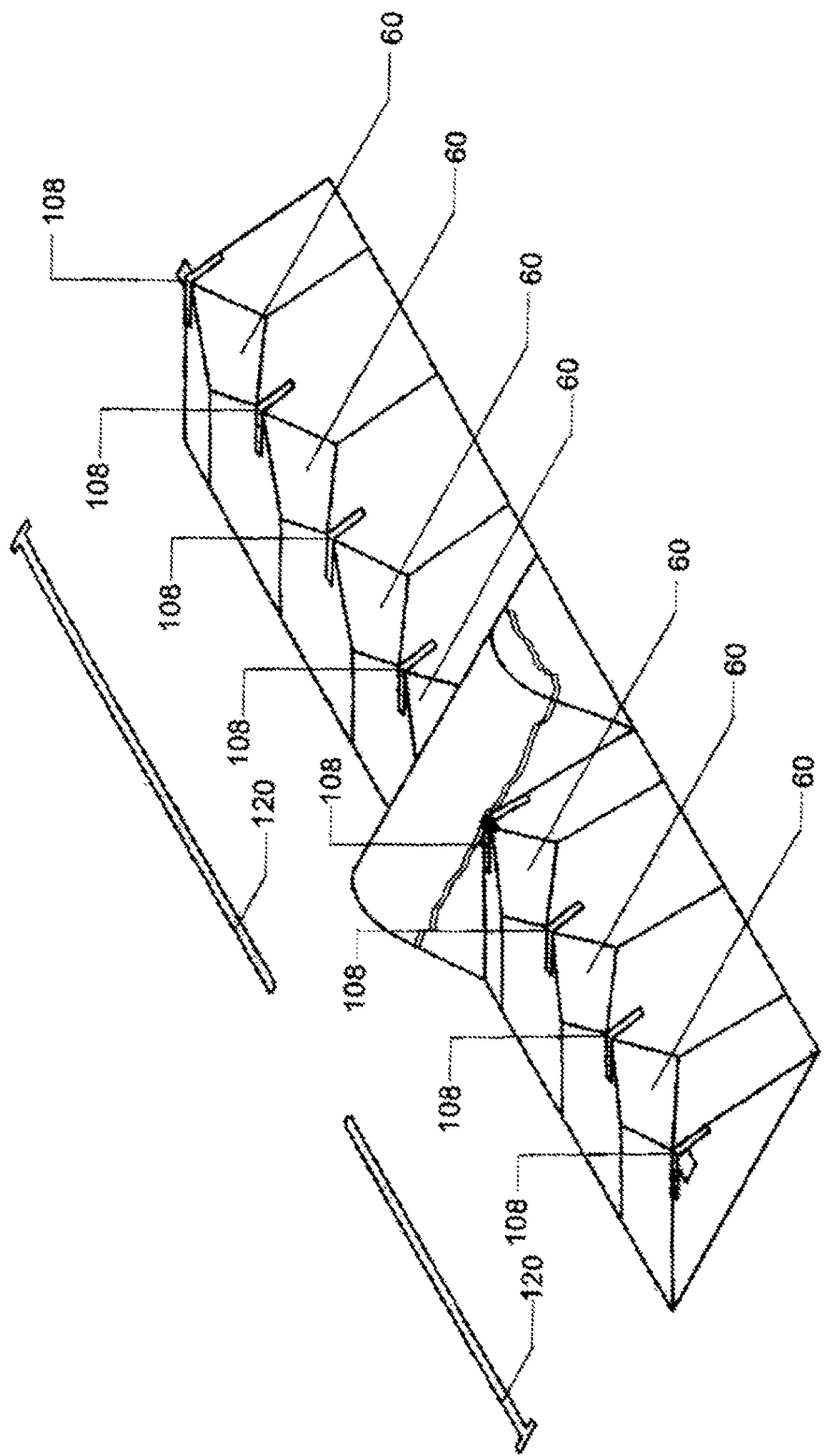

COLLAPSIBLE SUN COVER FOR MOTOR VEHICLE INTERIOR

CLAIM OF PRIORITY

This Application is a continuation of U.S. Non-Provisional application Ser. No. 12/268,979, filed Nov. 11, 2008, which claimed priority to U.S. Provisional Application No. 60/987,108, filed Nov. 12, 2007, each of which are incorporated herein by reference. This Application also claims priority under 35 U.S.C §119(a) to Australian Patent Application No. 2008243218, incorporated herein by reference.

BACKGROUND

Field of the Invention

The present disclosure relates to the field of car accessories, specifically a collapsible sun shield to protect the interior surfaces of a motor vehicle from excess heat and/or sun exposure.

Background

Car owners often leave their vehicles parked outside for long periods of time, whether in a parking lot while at work or shopping, or in the driveway of their own homes. Sun exposure for these long periods of time can cause extreme heat in the interior of a vehicle, especially in hot desert climates, and can cause discomfort or even harm to the driver and passengers. Sun exposure can also be very damaging to the vehicle's leather, plastic, and/or vinyl surfaces, causing discoloration or cracking.

Several products are currently on the market for protecting the interior of a car from sun exposure, however none are both convenient and effective in protecting a substantial portion of the interior of a car. For example, COVERCRAFT® sells sun shields that span across the interior of a car windshield, thereby partially blocking the sun's rays depending on the direction of the shield relative to the sun. However, these shields are neither efficient insulators nor effective at protecting the entirety of a car's interior surfaces regardless of the time of day or direction of the sun. COVERCRAFT® also markets exterior covers that must be stretched over the entire vehicle. While these covers solve the problem of protecting the entire interior surface of a car regardless of the direction of the sun, they are bulky, difficult to use, and inconvenient when one is pressed for time. Additionally, when in use these covers are exposed to the outdoor elements, accumulating dirt, dust, bird feces and/or insects. Side window sun shields also exist, such as the one taught in U.S. Pat. No. 5,379,822, however these products can be difficult to use and require multiple units for effectively blocking the entire interior of a vehicle from the sun.

An improvement on the abovementioned devices is described in U.S. Pat. No. 5,114,204, invented by the inventor of the present application. This device is composed essentially of a sheet of cover material supported by a frame that includes elongated arms situated horizontally along the opposite sides of the vehicle interior. However, due to the horizontal orientation and location of these arms, they need to include either a sliding or folding mechanism to allow the cover to be properly deployed in the vehicle interior and to be retrieved from deployment for storage in a relatively compact dimension. Such orientation and location of the support frame also works properly only if the segment of the cover it supports is flat, thus the cover cannot assume the appropriate angular shape needed to reflect the sunlight back out to the windshield, side windows and rear window of the vehicle. In addition, since these opposite elongated arms are not connected to each other, the user of the invention has to reach out to the other side of the vehicle and hold both arms of the cover while the related segment of the cover is slid or folded towards the desired direction, thereby making the cover difficult and cumbersome to use. None of the embodiments of this prior invention provide a systematic, consistent and quick way of folding the cover into a compact dimension for storage, thereby requiring a user to spend an impractical amount of time using and storing the device.

What is needed is a collapsible device that can cover the interior surfaces of a motor vehicle regardless of which direction sunlight is coming from, thereby insulating the interior, preventing excessive increase in temperature and avoiding harmful exposure to the sun's UV rays. The device should provide a systematic, consistent and quick way of folding the device into a compact dimension for storage after its use. It is desirable to have a device that minimizes the number of parts or components required for operation, as well as allows a user to easily deploy and retrieve the device from just one side of a vehicle without reaching to the other side. The device should also be useful without requiring modification of the car interior, such as drilling holes, and other permanent or provisional attachments to the car interior, such as hooks or hanging mechanisms.

BRIEF DESCRIPTION OF THE DRAWINGS

FIG. 2 depicts a perspective view of the present device.

FIG. 3 depicts a perspective view of an alternate embodiment of the present device.

FIG. 4 depicts one embodiment of an end of a stabilizing arm of the present device.

FIG. 5 depicts one embodiment of a fastening device of the present device.

FIG. 6 depicts the engagement of a stabilizing arm and a fastening device.

FIG. 9 depicts a perspective view of an alternate embodiment of the present device.

FIG. 13 depicts a perspective view of an alternate embodiment of the present device.

FIG. 14 depicts a side view of one embodiment of the present device.

FIG. 15 depicts a side view of an alternate embodiment of the present device.

FIG. 16 depicts a perspective view of an alternate embodiment of the present device.

FIG. 17 depicts a close-up perspective view of a portion of the device shown in FIG. 16.

FIG. 18 depicts a top view of one embodiment of the present device.

FIG. 20 depicts a perspective view of an alternate embodiment of the present device.

DETAILED DESCRIPTION

Figure 1:
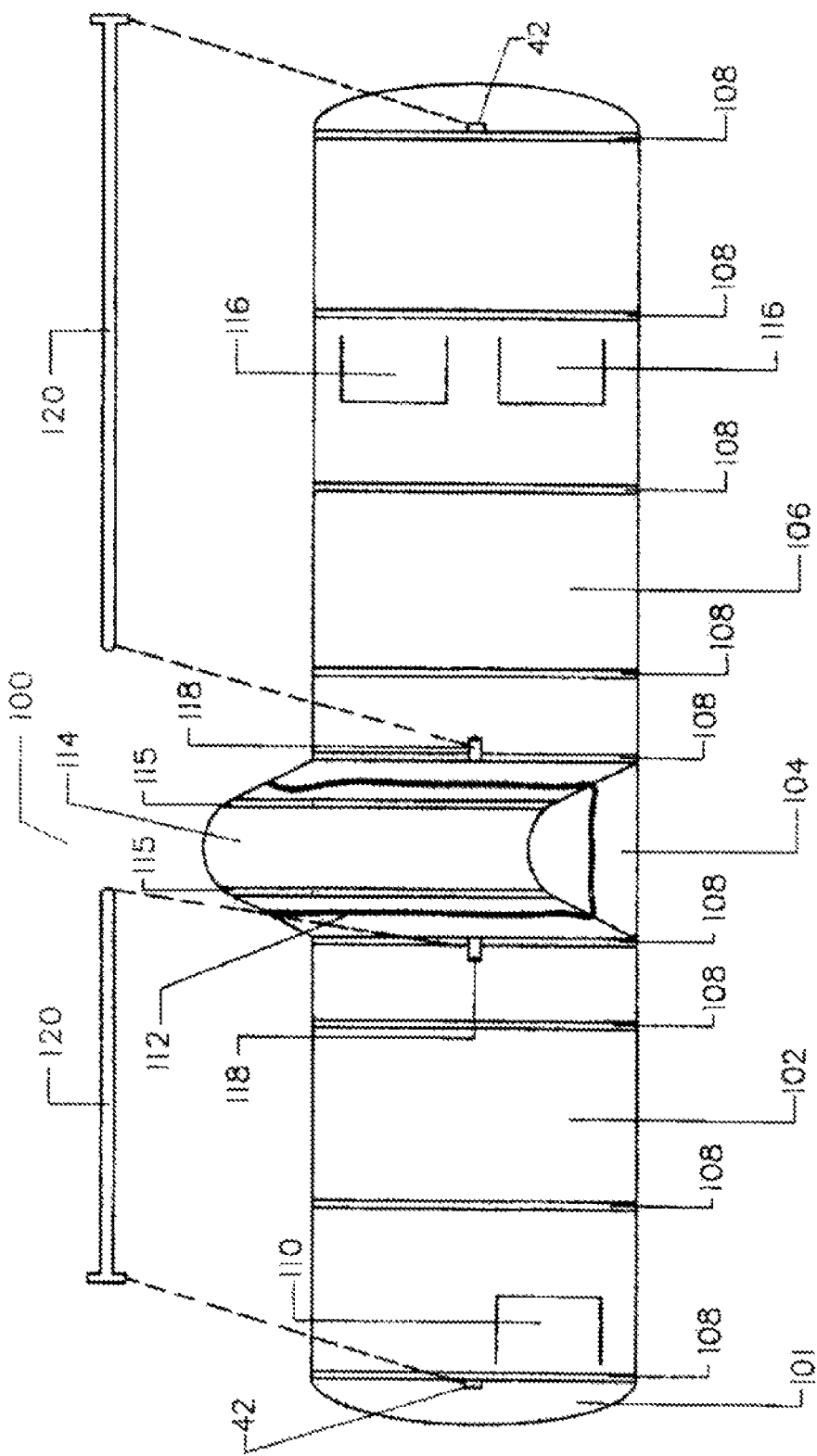
FIG. 1 depicts a perspective view of the present device.

FIG. 1 depicts a perspective view of the present device 100. A device 100 can be comprised of a sheet 101 having a front end, a back end, a front section 102, a middle section 104, and a rear section 106. Said sheet 101 can be substantially the same length and width as the portion of the interior of a motor vehicle desired to be covered. A front section 102 can have a first set of rigid arms 108 that can be permanently attached to said sheet 101 substantially perpendicular to the length of the motor vehicle in which a device 100 is to be used. In alternate embodiments, said first set of rigid arms 108 can be removably attached to said sheet 101 so that the sheet 101 can be laundered if needed. Said first set of rigid arms 108 can be spaced apart from each other in a manner that can allow for proper folding and storage of a device 100. A front section 102 can also have an adjustable steering wheel compartment 110 that can accommodate the height, width and depth of a vehicle steering wheel. An adjustable steering wheel compartment 110 can be comprised of a plurality of slits, the cut edges of which can be coupled with flexible material such that said compartment 110 can adjust to the dimensions of a steering wheel while keeping said steering wheel covered. In the embodiment shown in FIG. 1, the outer surface of an adjustable steering wheel compartment 110 can be facing the front windshield of a vehicle when in use, thereby deflecting the sun's rays back through said front windshield.

As shown in FIG. 1, a sheet 101 can be fabric, vinyl, thin plastic, polymer, or any other known and/or convenient flexible material. In other embodiments, and as shown in FIGS. 16 and 17, a sheet 101 can be made of rigid or semi-rigid material, such as plastic or any other known and/or convenient material. A sheet 101 can be made of a reflective material, insulating material, and/or heat-resisting material. A sheet 101 can also be manufactured in different dimensions so as to accommodate the dimensions of various vehicle models. A first set of rigid arms 108 can be plastic, fiberglass, metal, or any other known and/or convenient rigid material.

A middle section 104 can have a second set of rigid arms 108 that can be permanently attached to said sheet 101 substantially perpendicular to the length of the motor vehicle in which a device 100 is to be used. In alternate embodiments, said second set of rigid arms 108 can be removably attached to said sheet 101 so that the sheet 101 can be laundered if needed. Said second set of rigid arms 108 can be spaced apart from each other in a manner that can allow for proper folding and storage of device 100. A second set of rigid arms 108 can be plastic, fiberglass, metal, or any other known and/or convenient rigid material.

A middle section 104 can also have a first adjustable headrest compartment 114 that can accommodate the height, width, and depth of the headrests of the driver and front passenger seats of a motor vehicle. Said first adjustable headrest compartment 114 can be comprised of at least one protrusion in a sheet 101 that can temporarily house the driver and front passenger seat headrests of a motor vehicle. Said first adjustable headrest compartment 114 can be at a location about a sheet 101 such that said at least one protrusion can easily fit over the driver and front passenger seat headrests, and said location can be customized for different motor vehicle types and models.

A first adjustable headrest compartment 114 can have at least one fastening mechanism 112 located circumferentially about said first adjustable headrest compartment 114. Said at least one fastening mechanism 112 can be utilized to fold the material of said first adjustable headrest compartment 114 over itself when the dimensions of the driver and front passenger seat headrests are smaller than the dimensions of said headrest compartment 114 in a fully unfolded position. Said at least one fastening mechanism 112 can be hook and loop, snaps, protrusion and aperture, or any other known and/or convenient fastening mechanism. A first adjustable headrest compartment 114 can also have at least one rigid arm 115 that can be permanently or removably attached to said first adjustable headrest compartment 114 and can be placed substantially perpendicular to the length of the motor vehicle in which a device 100 is to be used. In the embodiment shown in FIG. 1, said at least one rigid arm 115 can be used primarily to assist in proper folding and storage of a device 100, however in other embodiments said at least one rigid arm 115 can be used as a support means for a first adjustable headrest compartment 114. Said at least one rigid arm 115 can be plastic, fiberglass, metal, or any other known and/or convenient rigid material.

A rear section 106 can have a third set of rigid arms 108 that can be permanently attached to said sheet 101 substantially perpendicular to the length of the motor vehicle in which a device 100 is to be used. In alternate embodiments, said third set of rigid arms 108 can be removably attached to said sheet 101 so that the sheet 101 can be laundered if needed. Said third set of rigid arms 108 can be spaced apart from each other in a manner that can allow for proper folding and storage of device 100. A third set of rigid arms 108 can be plastic, fiberglass, metal, or any other known and/or convenient rigid material. A rear section 106 can also have a second adjustable headrest compartment 116 that can accommodate the height, width, and depth of the headrests of the rear passenger seats of a motor vehicle. A second adjustable headrest compartment 116 can be have at least one section that can be comprised of a plurality of slits in a sheet 101. The cut edges of each of said at least one section can be coupled with flexible material such that said at least one section of a compartment 116 can adjust to the dimensions of at least one rear passenger headrest while keeping said headrest covered. In the embodiment shown in FIG. 1, a second adjustable headrest compartment 116 can have two sections for accommodating rear passenger headrests individually. In other embodiments, a second adjustable headrest compartment 116 can have just one section that can cover all read headrests. In yet another embodiment, a second adjustable headrest compartment 116 can have any number of sections for properly accommodating the rear headrests of a motor vehicle. In the embodiment shown in FIG. 2, the outer surface of each section of a second adjustable headrest compartment 116 can be facing the rear windshield of a vehicle when in use, thereby deflecting the sun's rays back through said rear windshield. Said second adjustable headrest compartment 116 can be at a location about a sheet 101 such that it can easily fit over the rear passenger seat headrests, and said location can be customized to fit the dimensions of different motor vehicle types and models.

A device 100 can have at least one removable stabilizing arm 120. A removable stabilizing arm 120 can be rigid and can be made of metal, plastic, fiberglass, or any other known and/or convenient material. At least one end of said stabilizing arm 120 can have an aperture that can removably attach to a fastening device 42, as shown in FIGS. 4-6. In the embodiment shown in FIG. 4, said stabilizing arm 120 has a square end with a square aperture there through, however in other embodiments the end of said stabilizing arm 120 can have any other known and/or convenient geometry. In FIG. 5, said fastening device 42 is a rigid hook, but in other embodiments can be any other known and/or convenient fastening device complementary to said stabilizing arm 120. As shown in FIG. 6, said stabilizing arm 120 can pass over said fastening device 42 until it can lock into place temporarily. At least one fastening component 118 can be located on at least one side of a first adjustable headrest compartment 114. A fastening component 118 can be adapted to accept one end of a stabilizing arm 120. The use of a stabilizing arm 120 can force the front section 102 of a sheet 101 into a taut state, thereby properly positioning and securing said sheet 101 when in use. In use, the stabilizing arm 120 can be used to push the front end of a sheet 101 to the desired location on top of a vehicle's dashboard. Then to keep the sheet 101 in an extended position, the opposite end of a stabilizing arm 120 can be inserted inside a fastening compartment 118. Similarly, and as shown in FIGS. 1 and 2, a second stabilizing arm 120 can be used to force the rear section 106 of a sheet 101 into a taut state by first temporarily coupling one end of a stabilizing arm 120 with a fastening device 42, and subsequently coupling the opposite end of a stabilizing arm 120 with a fastening compartment 118.

As shown in FIG. 3, a middle section 104 of a sheet 101 can be removable from a device 100. A sheet 101 can be physically separated into a front section 102, a middle section 104, and a rear section 106. The edges of a middle section 104 can have a first set of fastening components 23 capable of complementarily fastening to a second set of fastening components 25 located on each of the back end of a front section 102 and the front end of a rear section 106. In use, a user can first place a middle section 104, including a first adjustable headrest compartment 114, over the driver and front passenger seat headrests of a vehicle. Then, a user can removably fasten a front section 102 and a rear section 106 of a sheet to a middle section 104 using a first set of fastening components 23 and a second set of fastening components 25.

Figure 7:
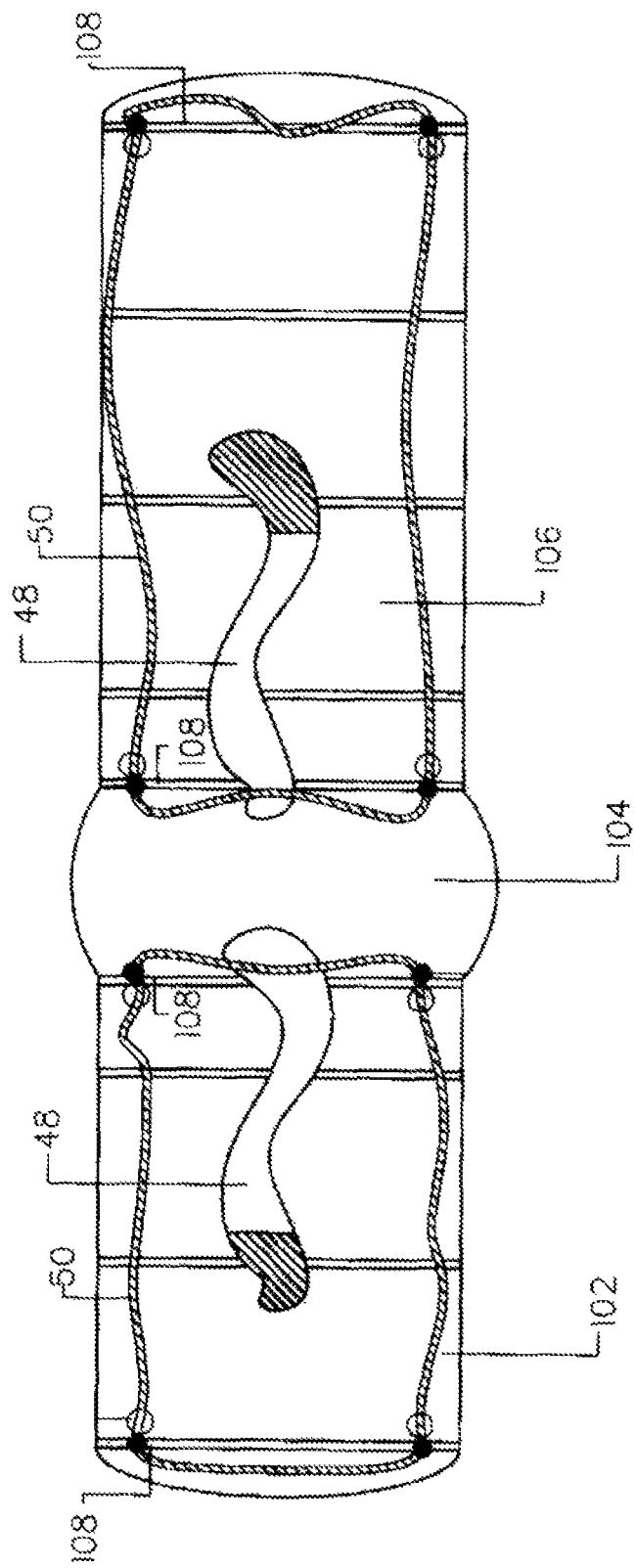
FIG. 7 depicts a perspective view of an alternate embodiment of the present device.

Despite the presence of rigid arms 108 and stabilizing arms 120, the sides of a sheet 101 may sag slightly when in use. Thus, as shown in FIG. 7, one embodiment of a device 100 can include at least one stretchable cord 50 located on a surface of a sheet 101. In the embodiment in FIG. 7, two stretchable cords 50 are shown, one being located on the front section 102 and another on the rear section 106. Said stretchable cords 50 can be connected to a plurality of rigid arms 108 such that when a device 100 is in use, said stretchable cords 50 can assist in pulling the edges of said device 100 taut. A stretchable cord 50 can be made of rubber, polymer, or any other known and/or convenient elastomeric material.

Figure 8:
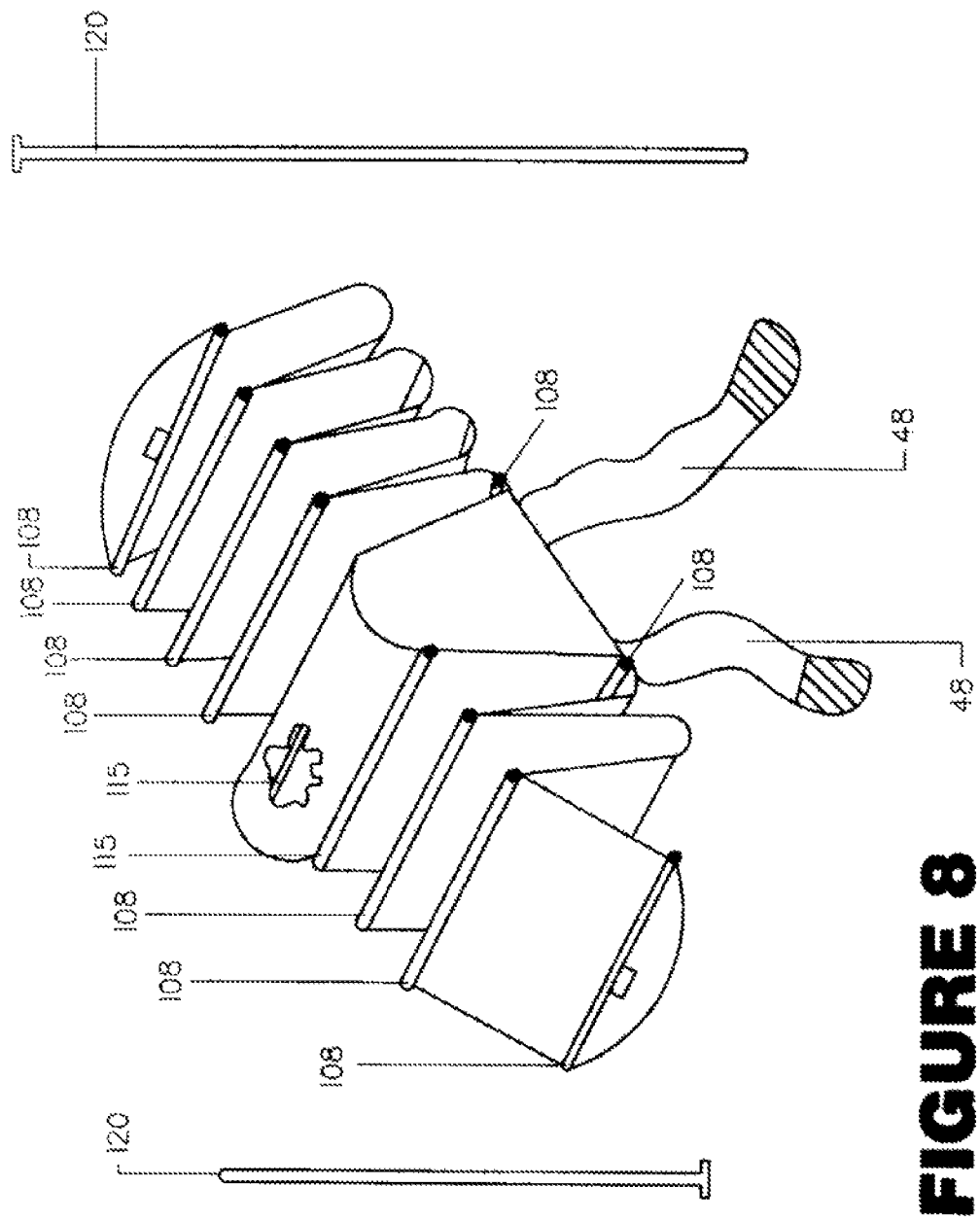
FIG. 8 depicts a partially folded view of one embodiment of the present device.

FIG. 8 depicts one embodiment of a device 100 in a semi-folded position. When a user desires to fold and store a device 100, the first step is to remove the at least one stabilizing arm 120 from said device 100. Then, a plurality of rigid arms 108 can be brought together in an accordion-like manner in order to fold said device 100 as compactly as possible. A set of straps 48 can be used to secure said device 100 in a folded position. As shown in FIG. 8, straps 48 can be located on the underside of a middle section 104. In other embodiments, straps 48 can be located at any other convenient location. Straps 48 can be tied around a device 100, or can have other means of securing a device 100 in a folded position, such as by use of snaps or hook and loop. Once folded, a device 100 and stabilizing arms 120 can be stored in a trunk of a vehicle, or at any other desired location.

Figure 11:
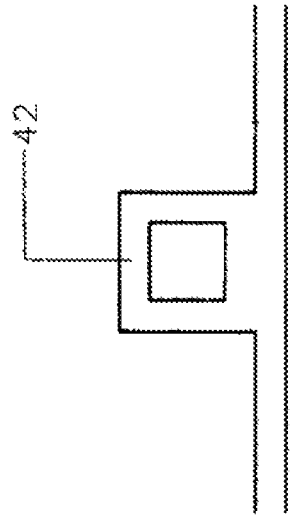
FIG. 11 depicts an alternate embodiment of a fastening device.
Figure 10:
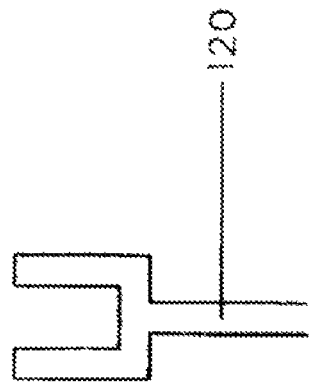
FIG. 10 depicts an alternate embodiment of an end of a stabilizing arm of the present device.
Figure 12:
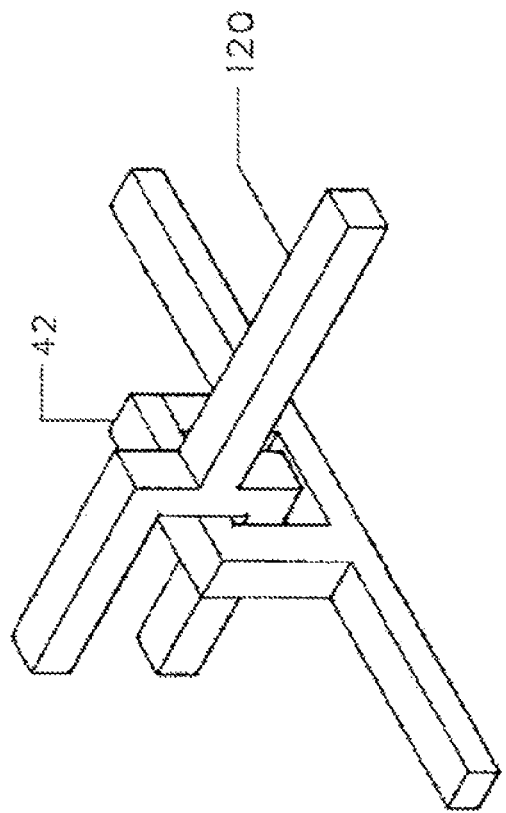
FIG. 12 depicts an alternate embodiment of the engagement of a stabilizing arm and a fastening device.

Another method of folding a device 100 is depicted in FIG. 9. A plurality of loops 54 can be attached to a plurality of rigid arms 108. Said loops 54 can be made of plastic, string, or any other known and/or convenient material. Said at least one stabilizing arm 120 can be threaded through one or more of a plurality of loops 54. The loops 54 which are closest to the front and rear ends of a sheet 101 can have extensions 200 that can be anchored at a middle section 104. As shown in FIGS. 10-12, at least one stabilizing arm 120 can have a forked end that can removably engage at least one fastening device 42 located at the front and/or rear ends of a device 100. Said fastening device 42 can have an aperture for accepting said forked end of said stabilizing arm 120. In order to fold a device 100, a user can pull extensions 200 towards the middle section 104 and away from the front and rear ends of a device 100. This action can force stabilizing arms 120 towards said middle section 104, thereby disengaging them from said fastening device 42. By continuing to pull extensions 200, a user can efficiently fold a device 100.

As shown in FIG. 13, a plurality of rigid arms 108 can be bent or curved such that the front section 102 and rear section 106 of a sheet 101 are sloped and can reflect sunlight out the side windows of a vehicle when in use. FIG. 14 shows a side view of this embodiment. FIG. 15 shows a side view of another embodiment in which a plurality of rigid arms 108 can be bent or curved to create the aforementioned slope effect, but the outermost rigid arms 108 can be bent or curved to a lesser degree than the innermost rigid arms 108 such that a sloping effect is created along the length of a device 100 from the middle section 104 outwards to either end of a sheet 101.

Figure 19:
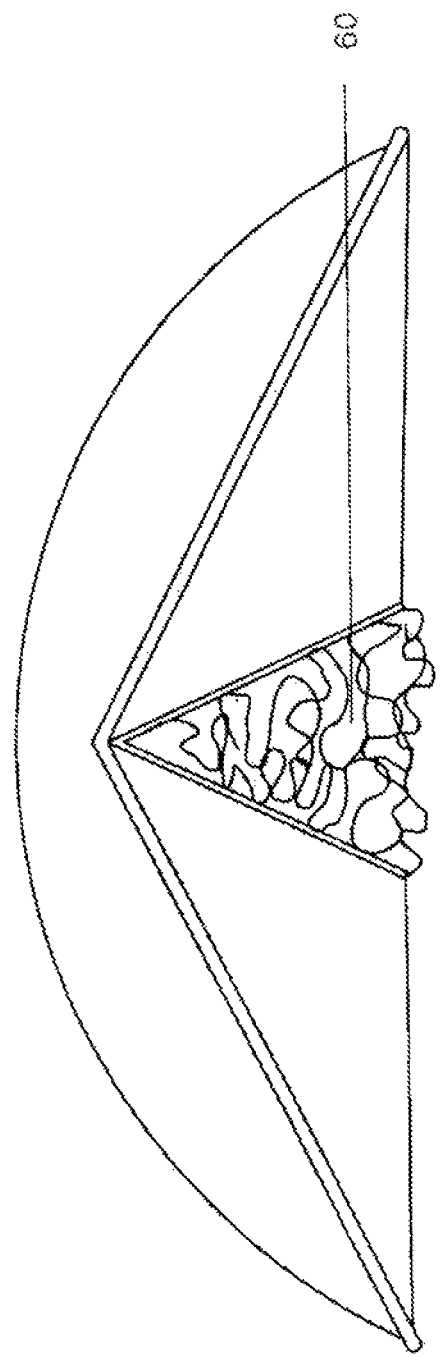
FIG. 19 depicts a back view of one embodiment of the present device.

As shown in FIGS. 16 and 17, a sheet 101 can be made of rigid or semi-rigid material. In this embodiment, a plurality of rigid arms 108 can be omitted. Instead, a plurality of creases 58 can extend across the width of a sheet 101, perpendicular to the length of a vehicle in which the device 100 is to be used. Said creases 58 can provide support and folding means for said device 100. A plurality of loops 54 as described above can be used in this embodiment, however said loops would be attached directly to a sheet 101 instead of a plurality of rigid arms 108. A sloping effect similar to that shown in FIGS. 13-15 can still be achieved when a sheet 101 is made of rigid material. As shown in FIG. 18, in the absence of a plurality of rigid arms 108, a plurality of diamond-shaped sections 60 can be located along the longitudinal midline of a sheet 101. Said diamond-shaped sections 60 can be made of flexible material attached to said sheet 101. The material on either side of said diamond-shaped sections 60 can be angled downward, thereby deflecting the sun's rays out of the side windows of a vehicle. During the folding process of a device 100, said diamond-shaped sections 60 can fold inward to allow for compact folding of a device 100. FIG. 19 depicts a fully folded back view of this embodiment, wherein the diamond-shaped sections 60 are gathered inside a pyramid-shaped space that is formed when a device 100 is full folded.

As shown in FIG. 20, a plurality of rigid arms 108 can be incorporated into a device 100 where a sheet 101 is made of rigid material, even if diamond-shaped sections 60 are also incorporated. Incorporation of said plurality of rigid arms 108 can be for added support of the overall structure of a device 100. In the embodiment in FIG. 20, said rigid arms 108 are shorter than in previous embodiments.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A vehicle sun shield, comprising:
   a sheet having a front end, a rear end, a front section, a middle section, and a rear section, said middle section having an adjustable headrest compartment comprising a protrusion in said sheet that is configured to fit over at least one motor vehicle headrest;
   a first plurality of rigid arms, each of said first plurality of rigid arms extending across the width of said front section and being perpendicular to the length of said sheet, at least one of said first plurality of rigid arms being bent at an angle at its center point such that said front section is raised along the longitudinal midline of said sheet relative to the areas of said front section that are not on said longitudinal midline;
   a second plurality of rigid arms, each of said second plurality of rigid arms extending across the width of said rear section and being perpendicular to the length of said sheet, at least one of said second plurality of rigid arms being bent at an angle at its center point such that said rear section is raised along said longitudinal midline of said sheet relative to the areas of said rear section that are not on said longitudinal midline;
   a first fastening device positioned on said longitudinal midline at said front end of said sheet;
   a first fastening component positioned on said longitudinal midline on a first side of said adjustable headrest compartment facing said front section;
   a second fastening device positioned on said longitudinal midline at said rear end of said sheet;
   a second fastening component positioned on said longitudinal midline on a second side of said adjustable headrest compartment facing said rear section;
   a first removable stabilizing arm having a first end configured to selectively attach to said first fastening device and a second end configured to be inserted into said first fastening component, such that when said first removable stabilizing arm's first end is attached to said first fastening device and said first removable stabilizing arm's second end is inserted into said first fastening component, said first removable stabilizing arm extends substantially between said front end and said middle section along the longitudinal midline of said front section and forces said front section into a taut state; and
   a second removable stabilizing arm having a first end configured to selectively attach to said second fastening device and a second end configured to be inserted into said second fastening component, such that when said second removable stabilizing arm's first end is attached to said second fastening device and said second removable stabilizing arm's second end is inserted into said second fastening component, said second removable stabilizing arm extends substantially between said middle section and said rear end along the longitudinal midline of said rear section and forces said rear section into a taut state.

2. The device of claim 1, wherein said middle section is removable from said sheet.

3. The device of claim 2, wherein said middle section is removably attached to said front and rear sections via complementary middle section fastening components.

* * * * *